United States Patent [19]

Edel et al.

[11] Patent Number: 4,816,941
[45] Date of Patent: Mar. 28, 1989

[54] DISK FILE DIGITAL SERVO CONTROL SYSTEM WITH OPTIMIZED SAMPLING RATE

[75] Inventors: Stephen F. Edel; Ich Van Pham, both of San Jose, Calif.

[73] Assignee: International Business Machines Corporation, Armonk, N.Y.

[21] Appl. No.: 97,787

[22] Filed: Sep. 16, 1987

[51] Int. Cl.$^4$ .................. G11B 5/55; G11B 21/08
[52] U.S. Cl. ..................... 360/78.12; 360/77.05; 318/561
[58] Field of Search ............... 360/77, 78, 75; 318/561, 567, 569, 571, 590, 592, 594, 568, 600, 632, 615–617, 636, 687; 364/148–151, 167–170; 369/32, 33, 41

[56] References Cited

U.S. PATENT DOCUMENTS

| | | | |
|---|---|---|---|
| 4,679,103 | 7/1987 | Workman | 360/77 |
| 4,697,127 | 9/1987 | Stich et al. | 318/561 |

OTHER PUBLICATIONS

*Digital Control of Dynamic Systems*, Franklin and Powell, Addison-Wesley Publishing Co. (1983) Chapter 6, pp. 131–139.

Primary Examiner—Alan Faber
Assistant Examiner—Steven R. Garland
Attorney, Agent, or Firm—Thomas R. Berthold

[57] ABSTRACT

A disk file digital servo control system incorporates means for measuring the time between samples of read/write head position error signals (PES), and uses a value of that measured time as part of the computation of the digital control signal. The digital servo control system has a microprocessor which runs a control signal algorithm, a portion of which is a state estimator for estimating the position, velocity and acceleration of the head. The state estimator requires the use of estimator constants determined from physical parameters of the disk file, including the PES sampling time. By using the actual measured PES sampling time, rather than a constant value of nominal PES sampling time, the estimator constants can be modified to improve the accuracy of the computed control signal. This results in improved performance of the control system to move the head to the target track whenever there are variations in the nominal PES sampling time caused by variations in the disk file drive motor speed.

5 Claims, 4 Drawing Sheets

DISK FILE DIGITAL SERVO CONTROL SYSTEM WITH OPTIMIZED SAMPLING RATE

TECHNICAL FIELD

This invention relates to servo control systems for read/write head positioning in data recording disk files. More particular, the invention relates to a digital servo control system which measures the actual time between samples of servo position information and uses this measured sampling time as part of the computation of the control signal.

BACKGROUND OF THE INVENTION

Disk files are information storage devices which utilize a rotatable disk with concentric data tracks containing the information, a head for reading or writing data onto the various tracks, and an actuator connected by a support arm assembly to the head for moving the head to the desired track and maintaining it over the track centerline during read or write operations. The movement of the head to a desired track is referred to as track accessing or "seeking", while the maintaining of the head over the centerline of the desired track during a read or write operation is referred to as track "following".

The actuator is typically a "voice coil motor" (VCM) which comprises a coil movable through the magnetic field of a permanent magnetic stator. The application of current to the VCM causes the coil, and thus the attached head, to move radially. The acceleration of the coil is proportional to the applied current, so that ideally there is no current to the coil if the head is perfectly stationary over a desired track.

In disk files which have a relatively high density of data tracks on the disk, it is necessary to incorporate a servo control system to maintain the head precisely over the centerline of the desired track during read or write operations. This is accomplished by utilizing prerecorded servo information either on a dedicated servo disk or on sectors angularly spaced and interspersed among the data on a data disk. The servo information sensed by the read/write head (or the dedicated servo head if a dedicated servo disk is used) is demodulated to generate a position error signal (PES) which is an indication of the position error of the head away from the nearest track centerline.

A recent development in disk file servo control systems, as described in assignee's U.S. Pat. No. 4,679,103, is a digital servo control system which, as part of the computation of the control signal to the actuator, makes use of a state estimator algorithm to estimate the position and velocity of the head. In this type of servo control system, a microprocessor receives, at discrete sample times, digital values corresponding to the PES and the actuator input current, and computes, through the use of the state estimator algorithm, a digital control signal. The digital control signal is then converted to an analog signal and amplified to provide a new actuator input current.

The method of estimating the state of the physical plant to be controlled in a digital control system requires the use of estimator "constants", the derivation of which is described in *Digital Control of Dynamic Systems*, Franklin and Powell, Addison-Wesley Publishing Co. (1983), chapter 6, pages 131-139. In the case of a disk film, these estimator constants are dependent upon the values of certain physical parameters of the disk file, such as the mass of the coil and head/arm assembly, the actuator force constant (the force applied to the coil per unit of input current), the gain of the VCM power amplifier, the PES gain and the time between PES samples (the PES sampling time).

The estimator constants are generally referred to as "constants" because the values of the physical parameters from which they are determined are generally invariable. However, the PES sampling time, which is the time between receipt of the PES samples by the microprocessor and thus the time between the beginning of consecutive control signal computations by the microprocessor, is a function of the speed of the drive motor which rotates the disks. Typically, disk file drive motors have a specified speed tolerance, e.g. plus/minus 3%. A variation in drive motor speed translates into a variation in the rate at which the head receives servo position information from the disk. Thus if a constant value of PES sampling time, corresponding to the nominal drive motor speed, is used in the estimator constants, the control signal generated by the microprocessor will be in error whenever the drive motor speed varies from its nominal speed. This control signal error will cause the head to undershoot or overshoot the target track when the head is moved between tracks, which could result in an unacceptable delay in the arrival of the head to the target track centerline, or in a seek error.

SUMMARY OF THE INVENTION

The invention is a disk file having a digital servo control system in which the actual PES sampling time is measured and used during the computation of the control signal.

In the preferred embodiment, a PES sampling clock generator receives the PES clock input corresponding to each discrete sample of servo timing information recorded on the disk, and generates a microprocessor interrupt signal. The frequency of the interrupt signal is thus directly related to the PES clock rate, which in turn is directly related to the drive motor speed. The sampling clock generator is designed such that its highest allowable frequency output, which corresponds to the highest allowable drive motor speed and thus the minimum allowable PES sampling time, is equal to the frequency at which the microprocessor generates the discrete control signals. As part of the computation of the control signal, the microprocessor recalls a previously stored value of PES sampling time (T) from a memory device and uses this value to modify the values of the estimator constants. The last instruction in the control signal algorithm is the reading into the memory device of a value equal to the minimum PES sampling time ($T_{min}$). If after this last instruction no interrupt is received from the sampling clock generator, the microprocessor continues to execute instructions to store in the memory device new values of PES sampling time, each successive value being incremented by an amount equal to the microprocessor cycle time. These instructions continue until an interrupt is received from the sampling clock generator. During the subsequent computation of the next control signal the new value of the PES sampling time is recalled from the memory device and used to modify the estimator constants. In this manner, for each new control signal computation, the actual PES sampling time is updated, stored in the memory device and recalled to modify the estimator constants during the next control signal computation. In the event the value of T exceeds the maximum allowable PES sampling time ($T_{max}$), corresponding to the slowest allowable drive motor speed, the microprocessor disables the VCM power amplifier and posts an error to the disk file control unit.

Because the digital servo control system uses the actual measured PES sampling time during each computation of the control signal, rather then relying upon a constant value based upon the nominal drive motor speed, the arrival of the head to the target track is substantially improved when there are variations in drive motor speed. In addition, with the use of the digital servo control system incorporating the present invention, less precise drive motors can be used in the disk file.

For a fuller understanding of the nature and advantages of the present invention, reference should be made to the following detailed description taken in conjunction with the accompanying drawings.

DESCRIPTION OF THE PREFERRED EMBODIMENTS

Figure 1:
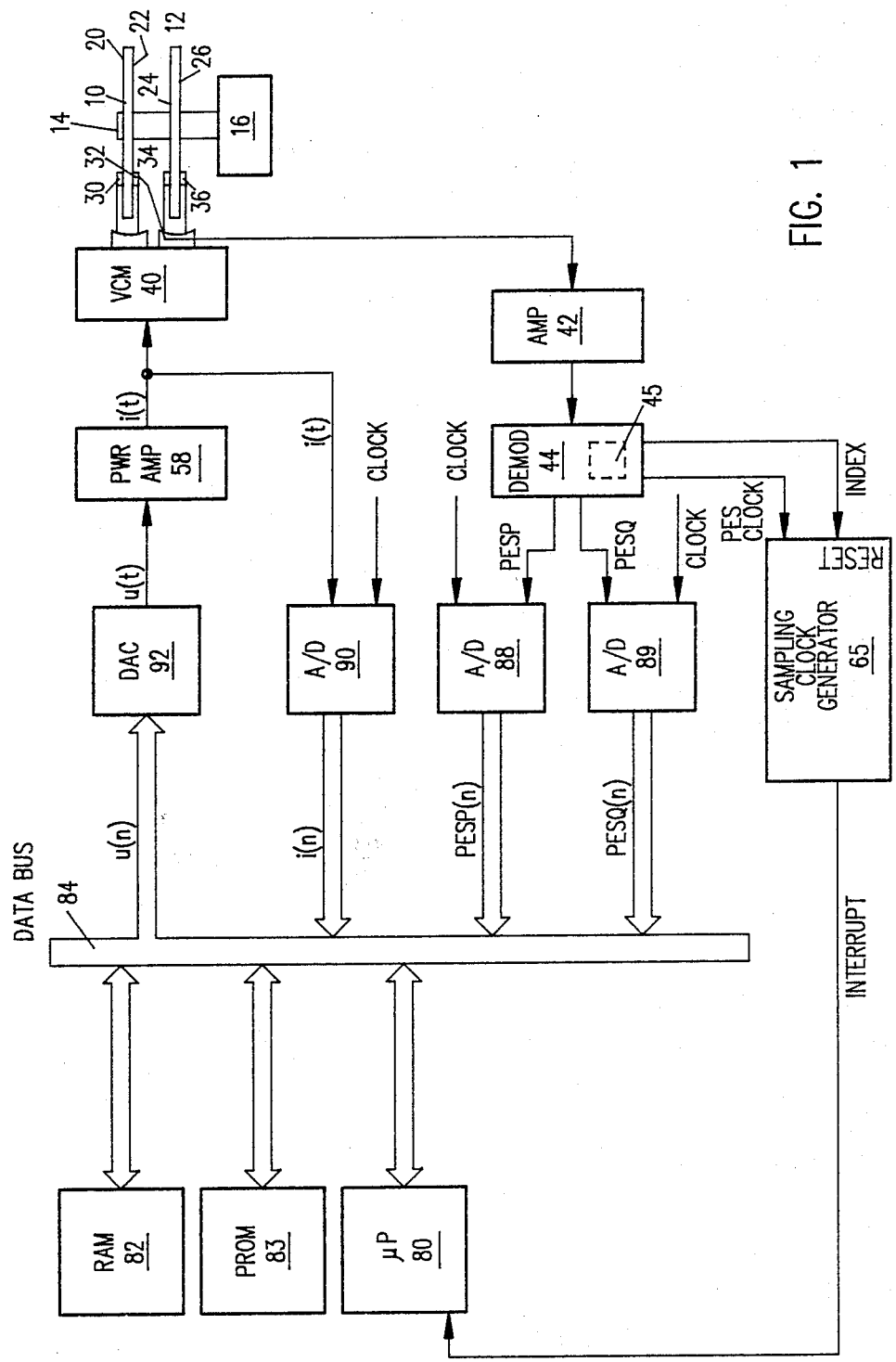
FIG. 1 is a block diagram of a digital servo control system of the present invention.

Referring first to FIG. 1, there is depicted a simplified block diagram of the digital servo control system and the means for generating the PES sampling clock. A pair of disks 10, 12 are supported on a spindle 14 of the disk file drive motor 16. Each of the disks 10, 12 has two surfaces 20, 22 and 24, 26, respectively. For purposes of this description, surface 20 on disk 10 and surfaces 24, 26 on disk 12 are data recording surfaces. Surface 22 on disk 10 is a dedicated servo surface and contains only prerecorded servo information.

Figure 2:
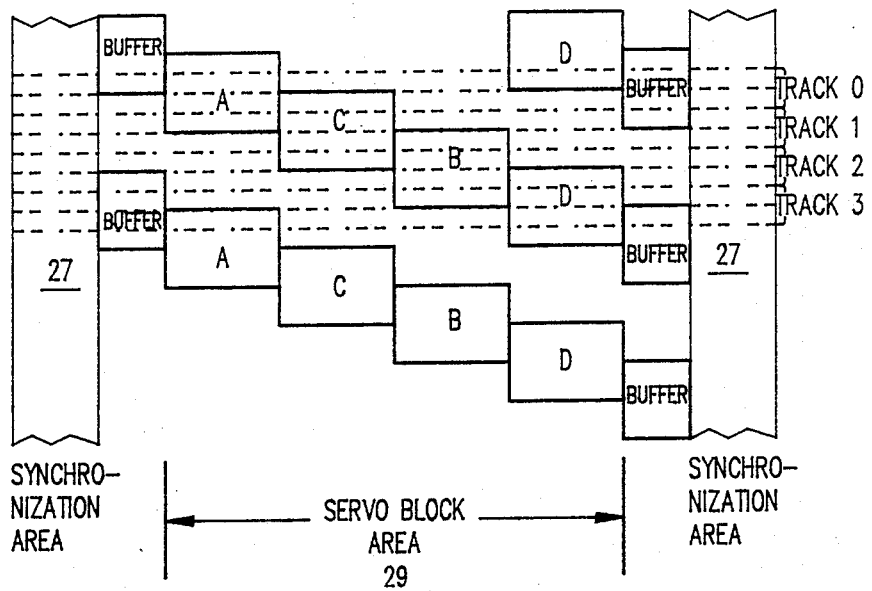
FIG. 2 is an illustration of servo timing information and servo position information recorded in the form of a quadrature pattern.

The servo information on disk 10 is recorded in concentric tracks, with the position information typically written in such a manner that the intersections of adjacent servo tracks on ervo surface 22 are radially aligned with the centerlines of the data tracks on surfaces 20, 24, and 26. A conventional quadrature servo pattern is depicted in FIG. 2. The servo pattern includes a synchronization area 27, which provides timing information corresponding to the beginning of a set of servo position blocks, and servo block area 29, which provides head position information.

The specific tracks on the data disks and the servo disk are accessed by heads 30, 32, 34, 36, each of which is associated with a respective disk surface and supported by an associated arm assembly. The heads 30, 32, 34, 36 are attached to a common accessing means or actuator, such as VCM 40. Thus the heads 30, 32, 34, 36 are all maintained in a fixed relationship with one another relative to the radial position on their respective disk surfaces.

The signal read by servo head 32 is input to amplifier 42 and then demodulator 44. While the invention is operable with any of numerous types of servo patterns and servo signal demodulation techniques, the servo control system will be explained with reference to the quadrature servo pattern, as represented in FIG. 2. The servo position information in block area 29 in the quadrature pattern on servo surface 22 is demodulated by demodulator 44 to generate two separate analog waveforms, designated primary (PESP) and quadrature (PESQ), as shown in FIG. 1. The analog PESP and PESQ signals from demodulator 44 are sent to analog-to-digital (A/D) converters 88, 89, respectively. The discrete values of PESP and PESQ at any sample time are designated PESP(n) and PESQ(n), where n represents a time index for each digital sample.

A microprocessor 80 is connected by data bus 84 and suitable address bus (not shown) to suitable memory devices, such as read/write memory (RAM) 82 and programmable read only memory (PROM) 83. Microprocessor 80 utilizes a control signal algorithm, as described in the '103 patent, to generate a control signal u(n). The control signal u(n) is output to digital-to-analog converter (DAC) 92 and amplified by power amplifier 58 to generate an analog current i(t) to VCM 40. The analog current i(t) is fed back to analog-to-digital (A/D) converter 90, which provides a digital current signal i(n) to microprocessor 80. Microprocessor 80 thus receives as inputs, at discrete sample times, the digital actuator current i(n) and the digital head position error signal PESP(n) and PESQ(n). Microprocessor 80 computes the actual position error signal PES(n) from the values of PESP(n) and PESQ(n), using conventional logic, as described in the '103 patent.

As previously described, demodulator 44 demodulates the position information in servo block area 29 from the quadrature servo pattern (FIG. 2) to generate analog PESP and PESQ signals. Demodulator 44 also contains synchronization detection circuitry 45 which receives the timing information from the synchronization areas 27 of the quadrature servo pattern and outputs a PES clock signal. The PES clock signal is output by synchronization detection circuitry 45 at a frequency corresponding to the rate at which the synchronization areas 27 in the servo pattern pass beneath the servo head 32. Thus the PES clock frequency is determined by the number of discrete sets of servo position blocks 29, (and thus the number of corresponding synchronization areas 27) recorded either on the dedicated servo disk or in sectors on the data disk, and the rotational speed of the drive motor 16. Since the number and spacing of recorded synchronization areas 27 are fixed, the PES clock frequency is solely a function of the rotational speed of drive motor 16.

The PES clock signal synchronization detection circuitry 45 is input to a sampling clock generator 65 which provides an interrupt signal to microprocessor 80. Sampling clock generator 65 may be a digital counter which divides the PES clock frequency by a fixed value to provide an interrupt signal at a frequency substantially slower than the PES clock input frequency.

In one embodiment of the invention, the combination of the synchronization areas 27 recorded on the disk and the nominal speed of drive motor 16 results in a PES clock frequency of approximately 3 MHz, corresponding to a time between PES clock pulses of approximately 330 nanoseconds (ns). The sampling clock generator 65 is a divide-by-336 digital counter which is reset for every revolution of the drive motor 16 by an index pulse corresponding to the beginning of a servo track and recorded on servo disk surface 22. Thus, the frequency of the interrupt signal generated by the sampling clock generator 65 in response to this nominal PES clock input frequency is approximately 8.9 kHz (3 MHz/336). This corresponds to a time between interrupt signals of approximately 112 microseconds. If the drive motor 16 has a speed tolerance of plus/minus 3%, then the time between PES clock pulses can vary between plus/minus approximately 10 ns, and the time between interrupt signals from sampling clock generator 65 can vary between plus/minus approximately 3.4 microseconds.

Each interrupt signal to microprocessor 80 initiates the beginning of the control signal algorithm. Thus the time between interrupts received by microprocessor 80 corresponds to the PES sampling time, the value of which affects the values of the estimator constants used in the state estimator portion of the control signal algorithm.

The specific algorithm for the computation of the control signal is described in the '103 patent. As part of the control signal computation, a state estimator is utilized which computes an estimate of the head position, velocity, and acceleration. The state estimator requires the use of estimator constants, which are defined below.

$p_{12} = K_x * T$,
$p_{13} = g_{31} = k_x * K_f * T^2 / (2*M)$,
$p_{23} = g_{32} = K_f * (T/M)$,
$g_{11} = K_x * K_f * K_p * D * (T_2 + T*m + m^2)/(6*M)$
$g_{12} = K_f * K_p * D * (T+m)/(2*M)$,
$g_{21} = K_x * K_f * K_p * (m^3)/(6*M)$,
$g_{22} = K_f * K_p * (m^2)/(2*M)$, where:
$K_x$ = PES gain,
$K_f$ = VCM force constant (the force generated by the VCM per unit of input current),
$K_p$ = power amplifier gain,
$T$ = PES sampling time,
$D$ = computation time delay between availability of analog PES and availability of digital control signal,
$m = T - D$, and
$M$ = mass of coil and head arm assembly.

The $p_{ij}$, $g_{ij}$ terms are generally invariable since they are functions of physical parameters of the disk file which do not generally change. However, as indicated previously, the disk drive motor 16 has a tolerance about its nominal rotational speed which causes the PES sampling time T to vary accordingly. If the nominal sampling time T is maintained as a constant during the computation of the control signal, then the head velocity predicted by the state estimator will be higher or lower then the actual head velocity whenever the disk drive motor speed varies from its nominal value. The result will be an unacceptable undershoot or overshoot of the head to the target track during a track seek, which significantly increases the access time of the actuator.

Figure 3:
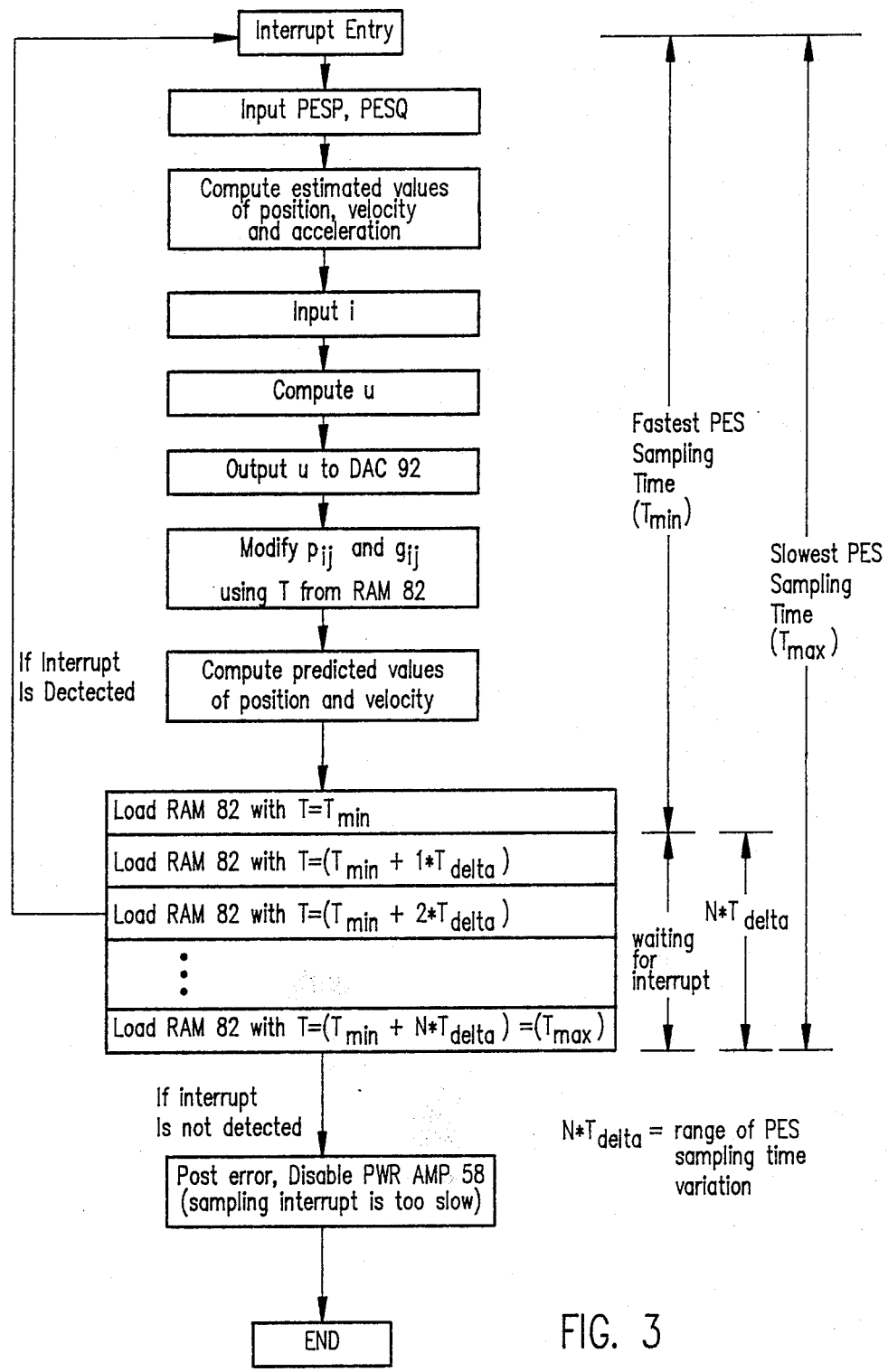
FIG. 3 is a flow chart illustrating the steps in the control signal algorithm and the manner in which the value of the PES sampling time is continuously updated until an interrupt is received.

Referring now to FIG. 3, there is illustrated a flow chart for the control signal algorithm which incorporates the measured actual PES sampling time (T). The microprocessor 80 begins the control signal computation upon receipt of an interrupt. The PESP and PESQ values are then read and the estimated values of head position, velocity and acceleration are computed from the previous predicted values. (The specific equations for the computation of the estimated and predicted values are described in the '103 patent). The value of actuator input current "i" is then read, and the digital control signal "u" is computed and output to DAC 92. The next instruction is to modify the values of $p_{ij}$ and $g_{ij}$ by recomputing them, based upon the actual value of T in RAM 82. (The initial value of T, which is the value used for the first control signal calculation after power on, may be either part of the algorithm or recalled from PROM 83). Following the modification of $p_{ij}$ and $g_{ij}$, the predicted values of head position and velocity are computed through the use of the state estimator and the modified estimator constants. The next instruction in the aglorithm is to write to RAM 82 a predetermined value of T equal to the minimum PES sampling time ($T_{min}$). It should be apparent that $T_{min}$, which corresponds to the highest possible drive motor speed, is selected to be equal to the time required for microprocessor 80 to run the complete control signal algorithm from receipt of the interrupt to execution of the instruction to store $T_{min}$ in RAM 82. As indicated in FIG. 3, the microprocessor 80 continues to perform additional instructions, each of which is to write into RAM 82 a new value of T incremented by $T_{delta}$, where $T_{delta}$ equals the cycle time of microprocessor 80. Thus, with each cycle of microprocessor 80 the value of T stored in RAM 82 is continuously increased, so long as no interrupt is received from sampling clock generator 65. When an interrupt is received by microprocessor 80, no further instructions are executed and the microprocessor then begins computation of a new control signal by inputting the next PESP and PESQ values. The value of T stored in RAM 82 immediately following receipt of an interrupt is equal to the fixed value of $T_{min}$ plus a discrete number of $T_{delta}$ values corresponding to the number of microprocessor cycles which have occurred between the instruction to write $T_{min}$ and receipt of the interrupt. Thus it should be apparent that RAM 82 is continually updated with the actual PES sampling time and this actual value is recalled and used to modify the estimator constants $p_{ij}$ and $g_{ij}$. The maximum number of microprocessor cycles N which can be run after the writing of $T_{min}$ to RAM 82 is selected so that $N*T_{delta}$ equals the range of PES sampling time variation. If no interrupt is received after N microprocessor cycles, the microprocessor 80 posts an error to the disk file control unit and disables VCM power amplifier 58.

In one embodiment of the invention, the nominal PES sampling time is 112 microseconds, which is the nominal time between interrupts output by sampling clock generator 65 and corresponds to the drive motor running at its nominal speed; $T_{min}$ equals approximately 109 microseconds and $T_{max}$ equals approximately 115 microseconds. The microprocessor has a cycle time of 200 ns. The value of N is selected to be 30 so that 30 additional instructions (corresponding to 6 microseconds) for the computation of T can occur after the loading of RAM 82 with $T_{min}$. The execution of all 30 additional instructions would occur only if the drive motor speed was at its slowest allowable speed.

FIG. 3 illustrates an embodiment which requires that N additional instructions be stored in PROM 83, but which maximizes the PES sampling time accuracy because the PES sampling time increment is just one microprocessor cycle, i.e. the time to load a new value of T into RAM 82. These N instructions could be reduced by the use of a "DO LOOP" type of approach, as follows:

Load RAM 82 with $T=T_{min}$
    10 Get T from RAM 82
    $T=T+T_{delta}$
    Load RAM 82 with T
    GO TO 10

The above loop would continue until an interrupt was received. Although this approach reduces the number of storage locations, there would be more than one microprocessor cycle for each PES sampling time increment, which would result in less accuracy for the measurement of the actual PES sampling time.

Figure 4A:
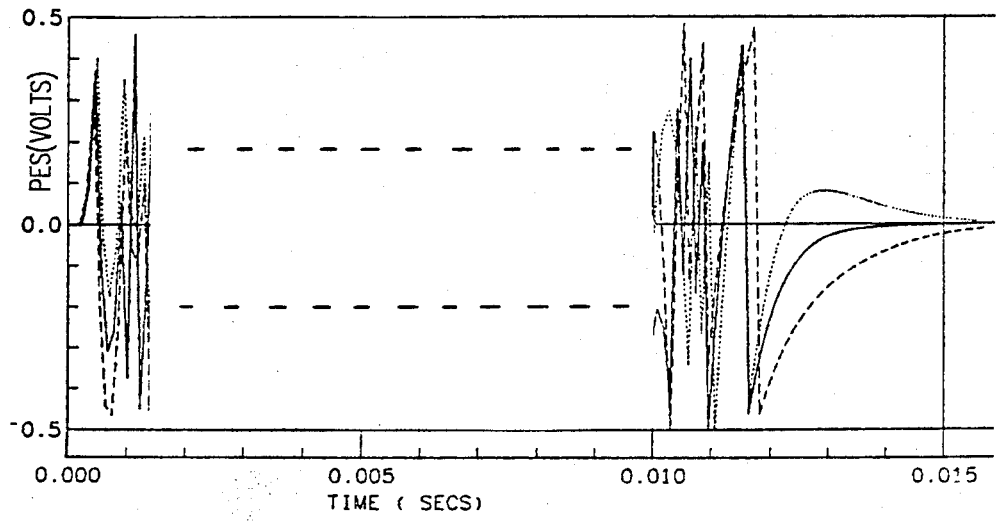
FIG. 4A is a comparison of head arrival trajectories for a typical seek for a digital servo control system using a constant nominal PES sampling time and FIG. 4B is for a digital servo control system according to the present invention using actual PES sampling time.
Figure 4B:
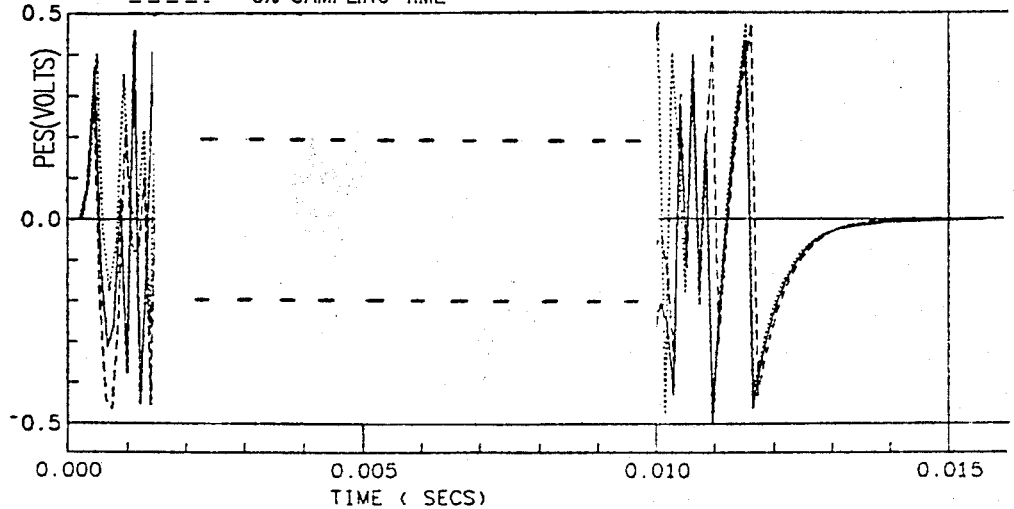

The improved performance of the digital servo control system utilizing the present invention is depicted in FIGS. 4A and 4B. In FIG. 4A there is illustrated the variation of the PES voltage during a typical track seek for three different speeds of the drive motor: a nominal speed indicated by the solid line, a speed of 3% greater than nominal indicated by the dotted line, and a speed 3% less than nominal indicated by the dashed line. It should be apparent from FIG. 4A that whenever the drive motor is operating other than at nominal speed, there is degraded performance in the arrival of the head to the target track because of the incorrect values of the estimator constants used to generate the estimated head position and velocity as part of the control signal computation. The same three track seeks are depicted in FIG. 4B, with the exception that although there is the same variation in drive motor speed, the present invention has been incorporated to modify the estimator constants during the computation of the control signal. As should be apparent from the last few milliseconds of the track seeks depicted in FIG. 4B, the head arrives with the optimum trajectory to the target track regardless of variations in drive motor speed.

Figure 5:
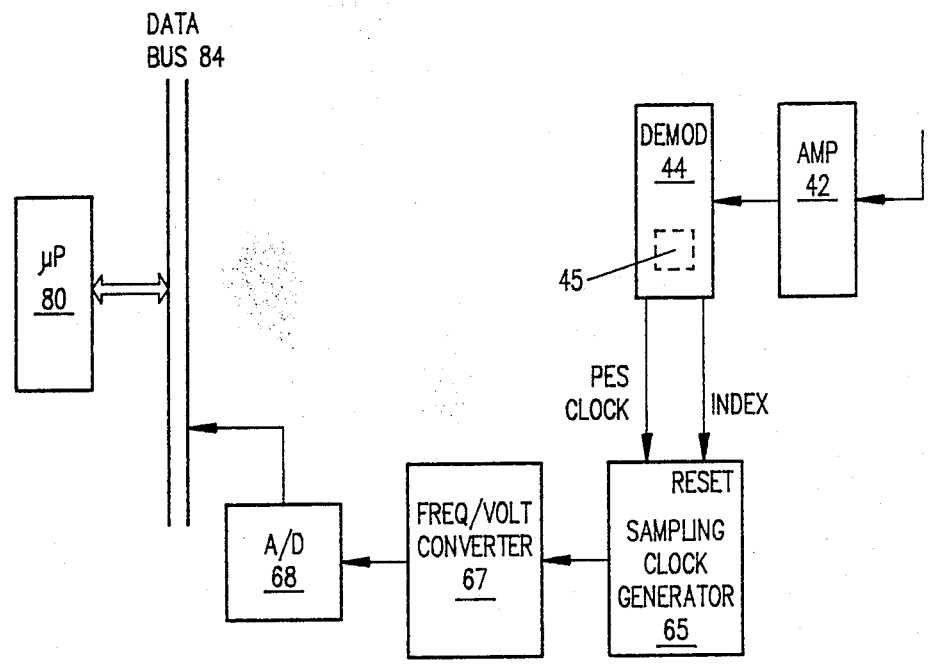
FIG. 5 is a block diagram of an alternative means for measuring the actual PES sampling time.

The above described technique for utilizng the actual PES sampling time to modify the estimator constants $p_{ij}$ and $g_{ij}$ is the preferred embodiment. There are alternative embodiments for measuring the actual PES sampling time and using that measured value to update the estimator constants. One such embodiment is depicted in FIG. 5. In this embodiment, the output of sampling clock generator 65, which will have a nominal frequency with a tolerance corresponding to the tolerance of the drive motor speed tolerance, is output to a frequency-to-volage converter 67. The output from frequency-to-voltage converter 67 is a DC voltage which is directly related to the frequency output from sampling clock generator 65. This DC voltage is then converted to a digital value by A/D converter 68 and input to data bus 84 where it is available for reading by microprocessor 80. Thus, rather than using the microprocessor software to detect the PES sampling time T, the microprocessor 80 directly reads a value corresponding to the actual PES sampling time and uses that value to modify the estimator constants during the computation of the control signal.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An improved data recording disk file of the type having at least one rotatable disk with generally concentric data tracks thereon, the data disk or a separate servo disk having servo information recorded thereon, at least one head for reading the servo information during rotation of the disk, means for processing from the servo information a head position error signal (PES) and a PES clock signal representative of a beginning of a PES, an actuator responsive to an input signal and attached to the head for positioning the head, and computing means for receiving, at discrete PES sampling times, digital values corresponding to the PES and for computing a digital control signal for use by the actuator, said computing means including means for estimating a state of the actuator from, among other things, estimator constants, the estimator constants being determined by disk file physical parameters including PES sampling time, wherein the improvement comprises:
    means for measuring an actual PES sampling time, and wherein the computing means includes means for modifying the estimator constants in response to the measured actual PES sampling time, wherein the computation of the control signal for use by the actuator is improved.

2. The improved disk file according to claim 1 wherein the measuring means comprises:
    means for generating an interrupt to the computing means in response to receipt of a predetermined number of PES clock signal;
    means for storing a first value corresponding to a predetermined PES sampling time; and
    wherein the computing means includes means for repetitively increasing said first value by a predetermined increment and for terminating said incrementing in response to an interrupt from said interrupt generating means.

3. The improved disk file according to claim 2 wherein the computing means is a microprocessor and wherein the means for repetitively increasing said first value comprises means for updating said first value for each microprocessor cycle, and wherein the predetermined increment is a value corresponding to a microprocessor cycle time.

4. The improved disk file according to claim 2 wherein the means for storing said first value comprises means for storing a value of a PES sampling time corresponding to a minimum allowable rotational speed of the rotatable disk.

5. The improved disk file according to claim 1 wherein the measuring means comprises:
    means responsive to the PES clock signal for generating a PES sampling clock signal having a frequency directly proportional to a frequency of the PES clock signal;
    means coupled to the PES sampling clock signal generating means for generating a DC voltage signal directly proportional to the frequency of the PES sampling clock signal; and
    an analog-to-digital conversion means coupled to the DC voltage signal generating means and to the computing means for generating a digital signal to the computing means.

\* \* \* \* \*